United States Patent Office 2,740,785
Patented Apr. 3, 1956

2,740,785
4-HYDROXY-5-ALKYL-6-ARYLPYRIMIDINE DERIVATIVES

Kurt J. Rorig, Evanston, and Robert T. Nicholson, Glenview, Ill., assignors, by mesne assignments, to G. D. Searle & Co., Skokie, Ill., a corporation of Delaware No Drawing. Application June 15, 1954,
Serial No. 436,992

8 Claims. (Cl. 260—256.4)

Our present invention relates to a new group of pyrimidine derivatives and, specifically, to 5-alkyl-6-arylpyrimidines substituted in the 2-position by an acylated or alkylated amino group and in the 4-position by a hydroxy group.

The compounds which constitute our invention can be represented by the general structural formula

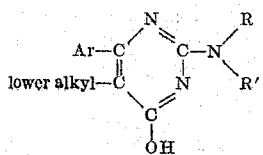

wherein Ar is a lower aryl radical, R is a lower alkyl, aryl, haloaryl or lower alkylcarbonyl radical, and R' is a hydrogen or lower alkyl radical.

In the foregoing structural formula Ar is an aryl radical, preferably a phenyl or a lower alkylated phenyl radical such as tolyl, xylyl, or ethylphenyl. The radical R can be a lower alkyl or (lower alkyl)—CO— radical wherein the lower alkyl group can be methyl, ethyl, straight-chain and branched propyl, butyl, amyl, and hexyl. The radical R can also be an aryl radical of the same descriptive type as Ar or a halogen-substituted derivative thereof such as fluorophenyl, chlorophenyl, bromophenyl and iodophenyl. The radical R' can be a hydrogen atom or a lower alkyl radical of the foregoing type. The lower alkyl group in the 5-position in the foregoing structural formula can represent a methyl, ethyl, straight or branched chained propyl, butyl, amyl, and hexyl group.

The compounds of my invention provide valuable medicinal agents. The compounds are active diuretics and bacteriostatic agents, but unlike the compounds containing an unsubstituted amino group in the 2-position they are not hypotensive.

The bases described herein form salts with a variety of inorganic and strong organic acids such as phosphoric, hydrochloric, hydrobromic, hydriodic, sulfamic, acetic, maleic, malic, succinic, tartaric, citric, ascorbic, gluconic, benzoic, cinnimic, or related acids. They also form quaternary ammonium salts with a variety of organic esters of sulfuric, hydrohalic, and aromatic sulfonic acids. Among such esters are methyl chloride, bromide, and iodide; the ethyl halides, propyl halides, butyl halides, isobutyl halides, benzyl halides, phenethyl halides, naphthylmethyl halides, dimethyl sulfate, methyl benzenesulfonate, ethyl toluenesulfonate, ethylene chlorohydrin, ethylene bromohydrin, and propylene halohydrins, allyl chloride, methallyl bromide, and crotyl bromide.

One of the convenient methods for the preparation of the compounds of our invention utilizes the condensation of lower alkyl esters of an α-aroylalkanoic acid of the type Ar—CO—CH(lower alkyl)—COO—lower alkyl with guanidine carbonate and acylation of the corresponding 2-amino-5-alkyl-6-aryl-4-pyrimidol with an acyl anhydride or halide.

Treatment of 2-amino-5-alkyl-6-aryl-4-pyrimidols with phosphorus oxyhalides yields the corresponding 2-amino-4-halo-5-alkyl-6-pyrimidines which, on treatment with sodium hydrogen sulfide, yield 2-amino-4-mercapto-5-alkyl-6-arylpyrimidines; these yield the acyl amino derivatives by treatment with acyl anhydrides and acyl halides. While the alkylated amines can be obtained by direct alkylation, we prefer to treat a 2-ethylmercapto-5-alkyl-6-aryl-4-pyrimidol with the corresponding monoalkylamine or dialkylamine. Likewise, the 2-arylamino and 2-halophenylamino compounds are conveniently obtained by treatment of these 2-ethylmercapto compounds with an arylamine or haloaniline.

The following examples will illustrate in further detail the compounds which constitute our invention and methods for their synthesis. However, the invention is not to be construed as limited thereby in spirit or in scope. In these examples quantities of materials are indicated in parts by weight.

Example 1

In a reaction vessel equipped with a reflux condenser and a drying tube, a solution of 170 parts of guanidine carbonate, 325 parts of the ethyl ester of α-benzoylpropionic acid and 1000 parts of ethanol is heated at reflux temperature for 12 hours. The reaction mixture is then stored at 0° C. for 24 hours. A precipitate forms which is collected on a filter and the mother liquor is evaporated under vacuum to about one-third of its original volume and then diluted with 1500 parts of hot water. Upon cooling, an additional yield of the 2-amino-5-methyl-6-phenyl-4-pyrimidol is obtained. The hydrochloride melts at about 225–227° C.

A mixture of 30 parts of 2-amino-5-methyl-6-phenyl-4-pyrimidol and 60 parts of fused sodium acetate is ground to a fine powder, treated with 195 parts of acetic anhydride, stirred and refluxed for 3 hours. The reaction mixture is then stirred with 2000 parts of cold water. The resulting precipitate is collected on a filter and washed with water. The 2-acetylamino-5-methyl-6-phenyl-4-pyrimidol thus obtained melts at about 289–290° C.

Example 2

Under anhydrous conditions, a mixture of 115 parts of sodium in 2000 parts of ethanol, 265 parts of thiourea and 516 parts of the ethyl ester of α-benzoylpropionic acid is stirred and heated at reflux temperature for 7 hours. The reaction mixture is then concentrated to near dryness, diluted with 2500 parts of water, treated with 390 parts of concentrated hydrochloric acid and acidified further with glacial acetic acid until the pH is lowered to 4. After cooling, the 2-mercapto-5-methyl-6-phenyl-4-pyrimidol is collected on a filter and recrystallized from dilute ethanol. It melts at about 236–237° C.

A mixture of 363 parts of sodium in 7200 parts of ethanol, 1720 parts of 2-mercapto-5-methyl-6-phenyl-4-pyrimidol and 960 parts of bromoethane is heated on a steam bath for 18 hours and then chilled. The precipitate is collected on a filter and an additional yield is obtained by concentrating the alcoholic filtrate to dryness. The combined solids are slurried in water and acidified with glacial acetic acid. The 2-ethylmercapto-5-methyl-6-phenyl-4-pyrimidol is collected on a filter, washed with water and recrystallized from a large volume of ethanol. It melts at about 192–193° C.

To a solution of 117 parts of dimethylamine in 320 parts of ethanol are added 32.5 parts of 2-ethyl-mercapto-5-methyl-6-phenyl-4-pyrimidol. The mixture is heated at 150° C. in a bomb with rocking for 16 hours. Then the contents of the bomb are evaporated to dryness and treated with dilute hydrochloric acid. Some tarry material is removed by filtration and the filtrate is neutralized with concentrated ammonium hydroxide. Upon chilling a white precipitate forms which is crystallized from 2-ethoxyethanol. 2-dimethylamino - 5 - methyl-6-phenyl-4-pyrimidol is thus obtained in white needles which melt at about 258–259° C.

*Example 3*

A mixture of 50 parts of 2-amino-5-methyl-6-phenyl-4-pyrimidol and 425 parts of phosphorus oxychloride is refluxed for 2 hours. The excess of phosphorus oxychloride is removed under vacuum and the residual oil is poured into 700 parts of ice and water. The mixture is made alkaline by addition of ammonium hydroxide and the temperature is maintained below 25° C. by addition of ice. On standing, the 2-amino-4-chloro-5-methyl-6-phenylpyrimidine precipitates. On recrystallization from ethanol, the compound is obtained in massive long prisms which melt at about 131–132.5° C.

A solution of 5 parts of metallic sodium in 100 parts of absolute ethanol is saturated with hydrogen sulfide and then treated with 22 parts of 2-amino-4-chloro-5-methyl-6-phenylpyrimidine in 52 parts of warm ethanol. The reaction mixture is stirred and refluxed for 9 hours after which 100 parts of ethanol are distilled off. The residue is diluted with 150 parts of water and made alkaline by addition of 20% aqueous sodium hydroxide. An insoluble, flocculent precipitate is removed by filtration, after which the pH is lowered to 6.5 by addition of acetic acid. The resulting yellow, flocculent precipitate is collected on a filter, dissolved in 170 parts of warm glacial acetic acid, cooled and filtered. The filtrate is diluted with 300 parts of water which are added slowly and with vigorous stirring. The pale, yellow granular precipitate is collected on a filter and washed with cold water. The 2-amino-4-mercapto-5-methyl-6-phenylpyrimidine thus obtained melts at about 270–274° C. with decomposition.

In a vessel equipped with an efficient stirrer and reflux condenser, a mixture of 46.6 parts of 2-amino-4-mercapto-5-methyl-6-phenylpyrimidine, 366 parts of pyridine and 252 parts of acetic anhydride is heated with stirring on a steam bath for 30 minutes, cooled to 45–50° C. and cautiously treated with water at that temperature to decompose the excess acetic anhydride. Then water is slowly added to the point of incipient precipitation. After chilling in an ice bath the yellow crystalline product is collected on a filter and air dried. The 2-acetyl-amino-5-methyl-6-phenyl-4-pyrimidinethiol thus obtained melts at about 241–244° C.

*Example 4*

Under anhydrous conditions a solution of 38 parts of guanidine carbonate, 99.3 parts of the ethyl ester of α-benzoylhexanoic acid and 300 parts of ethanol is stirred and refluxed for 10 hours, cooled and treated with solid carbon dioxide. The resulting precipitate is collected on a filter. Further yield is obtained by concentration of the filtrate and dilution with water. There is thus obtained 2-amino-5-n-butyl-6-phenyl-4-pyrimidol which melts at about 300–302° C. with decomposition.

A mixture of 10 parts of this product, 20 parts of sodium propionate and 35 parts of propionic anhydride is stirred and heated on a steam bath for 35 minutes. It is then cooled while the excess anhydride is carefully decomposed with water. More water is added and the precipitate is collected on a filter. There is thus obtained the 2-propionylamino-5-n-butyl-6-phenyl-4-pyrimidol in colorless high-melting prisms. The compound has the structural formula

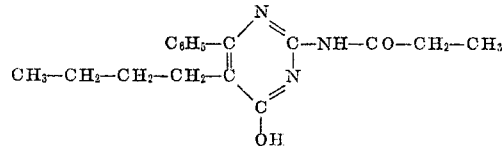

*Example 5*

An anhydrous mixture of 118 parts of the ethyl ester of α-(2,5-xyloyl)propionic acid, 53 parts of thiourea, and 23 parts of sodium in 1000 parts of ethanol is stirred and heated at reflux for 8 hours and then concentrated nearly to dryness. The residue is diluted with 500 parts of water, treated with 78 parts of concentrated hydrochloric acid and then with a sufficient amount of glacial acetic acid to lower the pH to 4. After cooling the 2-mercapto-5-methyl-6-(2,5-dimethylphenyl)-4-pyrimidol is collected on a filter and recrystallized from dilute ethanol.

An anhydrous mixture of 388 parts of this compound, 192 parts of bromoethane and 72.6 parts of sodium in 1440 parts of ethanol is heated on a steam bath for 15 hours and then chilled. A precipitate forms which is collected on a filter, an additional yield being obtained by concentration of the alcoholic filtrate. The combined product is slurried in water and acidified with glacial acetic acid. The 2-ethylmercapto-5-methyl-6-(2,5-dimethylphenyl)-4-pyrimidol thus obtained is collected on a filter, washed with water and recrystallized from a large quantity of ethanol.

A mixture of 10 parts of this compound and 52.5 parts of diethylamine in 200 parts of ethanol is shaken in a bomb at 150° C. for 16 hours and then concentrated under vacuum. The residue is extracted with dilute hydrochloric acid. The extract is neutralized with a concentrated ammonium hydroxide solution and then chilled. The resulting precipitate is collected on a filter and recrystallized from 2-ethoxyethanol. There is thus obtained the high-melting 2-diethylamino-5-methyl-6-(2,5-dimethylphenyl)-4-pyrimidol in white, shiny prisms. The compound has the structural formula

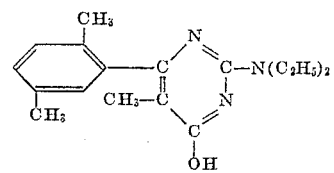

*Example 6*

A solution of 123 parts of 2-ethylmercapto-5-methyl-6-phenyl-4-pyrimidol and 91 parts of aniline in 500 parts of ethoxyethanol is refluxed for 50 hours and then chilled. A small amount of precipitate is removed by filtration and the mother liquor is diluted with water. On cooling, the 2-anilino-5-methyl-6-phenyl-4-pyrimidol is obtained as a fine crystalline precipitate. The compound has the structural formula

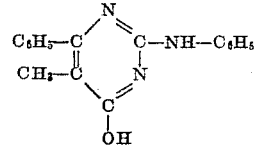

*Example 7*

A mixture of 246 parts of 2-ethylmercapto-5-methyl-6-phenyl-4-pyrimidol, 252 parts of p-chloroaniline and 1000 parts of ethoxyethanol is refluxed for 48 hours and then cooled. Some unreacted starting material is removed by filtration and the filtrate is diluted with an equal volume of warm water. On cooling there precipitates 2-(p-chloroanilino)-5-methyl-6-phenyl-4-pyrimidol which, recrystallized from ethanol, melts at about 265–266.5° C. with previous sintering at about 260° C. The compound forms white needles.

We claim:

1. A compound of the structural formula

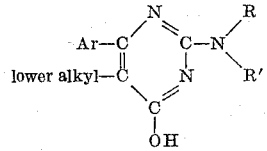

wherein Ar is a monocyclic aryl hydrocarbon radical, R is a member of the class consisting of lower alkyl, lower alkylcarbonyl, monocyclic aryl hydrocarbon and halophenyl radicals and R' is a member of the class consisting of hydrogen and lower alkyl radicals.

2. A 2-di(lower)alkylamino-5-lower alkyl-6-phenyl-4-pyrimidol.

3. 2-dimethylamino-5-methyl-6-phenyl-4-pyrimidol.

4. A compound of the structural formula

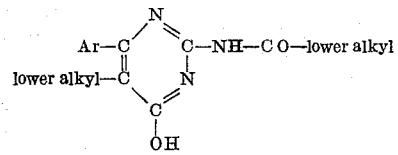

wherein Ar is a monocyclic aryl hydrocarbon radical.

5. 2-acetylamino-5-methyl-6-phenyl-4-pyrimidol.
6. 2-anilino-5-(lower alkyl)-6-phenyl-4-pyrimidol.
7. 2-anilino-5-methyl-6-phenyl-4-pyrimidol.
8. 2-(p-chloroanilino)-5-methyl-6-phenyl-4-pyrimidol.

References Cited in the file of this patent

UNITED STATES PATENTS

| | | |
|---|---|---|
| 2,621,182 | Hitchings | Dec. 9, 1952 |
| 2,671,087 | Hitchings et al. | Mar. 2, 1954 |
| 2,676,965 | Hitchings et al. | Apr. 27, 1954 |
| 2,688,019 | Hitchings et al. | Aug. 31, 1954 |
| 2,691,655 | Hitchings et al. | Oct. 12, 1954 |